3,392,209
PROCESS FOR PREPARATION OF
ALIPHATIC TRIENES
Wolfgang Schneider, Broadview Heights, Ohio, assignor to The B. F. Goodrich Company, New York, N.Y., a corporation of New York
No Drawing. Filed Sept. 28, 1965, Ser. No. 491,037
8 Claims. (Cl. 260—677)

ABSTRACT OF THE DISCLOSURE 1,4,9-decatrienes are useful third monomers in preparing sulfur-vulcanizable elastomers with ethylene and propylene and are prepared by reacting ethylene with butadiene or isoprene in the presence of a catalyst formed by reacting together a reducible compound of nickel with reducing agents including alkali, alkaline earth and aluminum metals, hydrides, alkoxides and alkyls thereof, and sulfur dioxide.

---

This invention relates to an improved method for preparing 1,4,9-decatrienes.

1,4,9-decatrienes, including 1,4,9-decatriene and dimethyl-1,4,9-decatrienes, are useful third monomers in preparing sulfur-vulcanizable elastomers of ethylene and propylene. In the preparation of 1,4,9-decatriene by known methods, the yield has been lower than is desirable so that the cost of this material for use in polymerization has been higher than is acceptable for large volume commercial production of such interpolymers. In my copending application for "Preparation of Aliphatic Trienes," Ser. No. 491,020, filed Sept. 28, 1965, I disclose a novel and improved process for preparing 1,4,9-decatrienes in good yields which comprises reacting a conjugated diene such as butadiene or isoprene with ethylene in the presence of a catalyst which is formed by reacting together in the 1,3-diene a reducible compound of nickel with a reducing agent such as alkali, alkaline earth and aluminum metals, hydrides, alkoxides and alkyls thereof, and a sulfone. I have now discovered, quite unexpectedly, that in place of a sulfone that sulfur dioxide can be used with excellent results.

The reducible nickel compounds are those which are readily reduced by an alkyl metal compound. Useful nickel compounds include the halides as the chlorides and bromides, sulfates, hydroxides, nitrates, acetates, oxalates, and other salts of inorganic and organic acids and co-ordination compounds which are organic compounds of nickel, as the chelates, in which the nickel atom is attached to two functional groups of a molecule by a main valence bond and coordinately; for example, nickel acetylacetonate.

The reducing agents, which may be I-A, II-A, or III-A metals, hydrides, or alkyl derivatives thereof, are usually organo-metallic compounds, including lithium alkyls, beryllium alkyls, aluminum alkyls, mixtures of alkali, alkaline earth and aluminum metals and alkyl halides, and alkoxides, and the like. More usually employed are aluminum alkyls, alkyl alkoxides, hydrides and aluminum alkyl halides having the formula $R_3Al$ or $R_xAlX_y$ wherein R is an alkyl group containing 1 to 12 carbon atoms, preferably 2 to 8, X is an alkoxyl, hydride or a halogen atom, and $x$ is 1 or 2, $y$ is 1 or 2, and $x+y=3$. Typical compounds include triethyl aluminum, tributyl aluminum, triisobutyl alumium, diethyl aluminum chloride, dibutyl aluminum chloride, ethyl aluminum dichloride, diethyl aluminum ethoxide, propyl aluminum dichloride, diisobutyl aluminum chloride, and mixtures thereof. Other useful organo-metallic compounds include zinc diethyl, and Grignard reagents as ethyl magnesium bromide and other alkyl magnesium halides, also wherein the alkyl group contains 1 to 12 carbon atoms.

In addition to the organo-metallic compounds, metals which have a reducing action on nickel compounds can be used as reducing agents, for example metals belonging to I-A, II-A or III-A or the lanthanide group of the Periodic Table. Of these metals it is preferred to use lithium, sodium, potassium, magnesium, calcium, strontium, beryllium, barium, aluminum, gallium, indium, and cerium. They are conveniently used in a condition in which they have a large surface, for example, in the form of chips or powder. Obviously, alloys or mixtures of two of the said metals may also be used. In many cases the use of an alkyl or aryl halide or a halide of an element of Group II-A or III-A along with the metal is of advantage. Of the halides, the bromides and chlorides are preferred. Examples of suitable compounds are allyl chloride and bromide, ethyl chloride and bromide, boron trichloride, aluminum chloride, and the like.

In the preparation of the catalyst, the nickel compound and reducing agent are reacted together in the presence of a diene. The sulfur dioxide may be added during this reaction or thereafter. Suitable 1,3-dienes are butadiene-1,3, isoprene, and the like.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures in a range of about 50° C. to 150° C. Higher temperatures favor formation of the trienes.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g. and more normally at pressures of about 200 p.s.i.g. to about 1,000 p.s.i.g., more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mol of nickel per mol of diene; 0.1 to 10 mols of sulfur dioxide per mol of nickel, preferably 0.25 to 2 mols per mol equivalent of nickel; and 1 mol equivalent of nickel to 1 to 10 mol equivalents of reducing compound per mol of nickel. On a weight basis, per 100 weight parts of conjugated 1,3-diene, from $10^{-1}$ to $10^{-3}$ weight parts of nickel acetylacetonate, $10^{-1}$ to $10^{-4}$ weight percent sulfur dioxide and about 1 to $10^{-3}$ weight percent reducing agent may be used. Larger amounts of catalyst are not normally required.

It is convenient to carry out the process without a solvent. If it is desired to use solvents, suitable solvents include aliphatic, cycloaliphatic and aromatic hydrocarbons, such as hexane, heptane, cyclooctane, benzene, hydrocarbon mixture of petroleums boiling between 60 and 200° C. Purified anhydrous starting materials and solvents are employed.

A general procedure for preparation of the 1,4,9-decatrienes is carried out by suspending the nickel compound in the conjugated diene. This mixture is cooled to below about 0° C. The reducing agent is added slowly over a period of time. The sulfur dioxide is then added. The mixture is agitated while maintaining the temperature at about −10° C. to 0° C. The resulting solution is pressured with ethylene and heated at about 50 to 100° C. at 500 p.s.i. for several hours. The autoclave is then cooled and depressured, and the 1,4,9-decatriene isolated by distillation. The following examples demonstarte specific embodiments of this invention.

Example

In a reactor 120 grams of 1,3-butadiene was cooled to $-10°$ C. and 1 gram (3.9 millimols) of nickel acetylacetonate was stirred into the butadiene. Thereafter 2 ml. of triisobutyl aluminum was slowly added. 100 cc. of gaseous sulfur dioxide (3.9 millimols) was then added. After about 30 minutes with agitation this catalyst solution was charged to a cool 320 ml. autoclave and 57 grams of ethylene charged into the autoclave. The reactor was then heated to $95°$ C. for 65 hours. The reactor was vented and the unreacted butadiene-1,3 and ethylene flashed off. A conversion of 92% and yield of 58.8 weight percent of 1,4,9-decatriene was obtained along with 22.9% cyclodecadiene. When this example is repeated with isoprene instead of butadiene-1,3, improved yields of dimethyl-1,4,9-decatrienes are obtained.

The example was repeated with two other reducing agents, (1) 10 millimols of zincdiethyl and (2) 10 millimols of ethyl magnesium bromide; and nickel oxalate, nickel bromide, and nickel dimethyl glyoxime. Good yields of 1,4,9-decatriene were obtained in each run.

The 1,4,9-decatrienes polymerize readily with ethylene and propylene to form sulfur-vulcanizable products. One commercial and economic advantage of this process is that polymerization grade butadiene-1,3 and isoprene are not required. Streams from ethylene cracking units which contain dienes may be used in preparing the 1,4,9-decatrienes.

I claim:

1. A method for preparing aliphatic 1,4,9-decatrienes which comprises reacting conjugated dienes containing 4 to 6 carbon atoms with ethylene in the presence of a catalyst comprising nickel in a reduced state prepared by reacting together a compound of nickel, a reducing agent selected from the group consisting of I–A, II–A, and III–A metals and their hydride, alkyl and alkyl halide derivatives, and sulfur dioxide.

2. The method for preparing aliphatic 1,4,9-decatrienes which comprises reacting a conjugated diene selected from the group consisting of butadiene and isoprene with ethylene in the presence of a catalyst comprising a salt of nickel reacted with an aluminum compound having the structure $R_3Al$ or $R_xAlX_y$, wherein R is an alkyl group containing 1 to 12 carbon atoms, X is an alkoxyl, hydrogen or a halogen atom, $x$ is 1 or 2, $y$ is 1 or 2, and $x+y=3$, and sulfur dioxide.

3. A method for preparing aliphatic 1,4,9-decatrienes which comprises reacting butadiene-1,3 with ethylene in the presence of a catalyst comprising the reaction product of a nickel salt in a concentration of from $10^{-3}$ to $10^{-5}$ mol of nickel per mol of butadiene-1,3, isoprene or piperylene, 1 to 10 mol equivalents of an alkyl aluminum compound having the structure $R_3Al$ and $R_xAlX_y$, wherein R is an alkyl group containing 1 to 12 carbon atoms, X is a halogen atom, $x$ is 1 or 2, $y$ is 1 or 2, and $x+y=3$, to 1 mol equivalent of nickel and 0.1 to 10 mols of sulfur dioxide.

4. The method of claim 2 wherein the nickel salt is an acetylacetonate and the aluminum compound has the formula $R_3Al$.

5. A method of preparing aliphatic 1,4,9-decatriene which comprises reacting butadiene-1,3 with ethylene in the presence of a catalyst comprising a salt of nickel reacted with an aluminum alkyl, and sulfur dioxide.

6. A method for preparing aliphatic 1,4,9-decatrienes which comprises reacting butadiene-1,3 with ethylene in the presence of a catalyst comprising nickel acetylacetonate reacted with an alkyl magnesium halide, and sulfur dioxide.

7. The method for preparing aliphatic 1,4,9-decatrienes which comprises reacting a conjugated diene selected from the group consisting of butadiene-1,3 or isoprene with ethylene in the presence of a catalyst comprising a nickel salt in a concentration of from $10^{-3}$ to $10^{-5}$ mol of nickel per mol of butadiene-1,3 or isoprene, 1 to 10 mol equivalents of an alkyl aluminum compound having the formula $R_3Al$ wherein R is an alkyl radical containing 2 to 8 carbon atoms, to 1 mol equivalent of nickel and 0.1 to 10 mols of sulfur dioxide, per equivalent of nickel.

8. The method of claim 7 wherein the salt is nickel acetylacetonate and the alkyl aluminum compound is triisobutyl aluminum.

References Cited

UNITED STATES PATENTS 2,599,249    6/1952    Friedman _____ 260—680

FOREIGN PATENTS 1,018,369    1/1966    Great Britain.
1,043,143    1/1966    Great Britain.

DELBERT E. GANTZ, *Primary Examiner.*

J. D. MYERS, *Assistant Examiner.*